(12) United States Patent
Sumer et al.

(10) Patent No.: US 12,304,515 B2
(45) Date of Patent: May 20, 2025

(54) VEHICLE PATH ADJUSTMENT

(71) Applicant: Ford Global Technologies, LLC, Dearborn, MI (US)

(72) Inventors: Erol Dogan Sumer, Ann Arbor, MI (US); Abhishek Sharma, West Bloomfield, MI (US); Mohit Srinivasan, Ann Arbor, MI (US); Alexander Jaeckel, Ann Arbor, MI (US); Michael Hafner, San Carlos, CA (US); Mrdjan J. Jankovic, Birmingham, MI (US); Aakar Mehra, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 17/839,637

(22) Filed: Jun. 14, 2022

(65) Prior Publication Data

US 2023/0399002 A1    Dec. 14, 2023

(51) Int. Cl.
| | | |
|---|---|---|
| *B60W 50/08* | (2020.01) | |
| *B60W 40/13* | (2012.01) | |
| *B60W 50/02* | (2012.01) | |
| *B60W 50/06* | (2006.01) | |

(52) U.S. Cl.
CPC .......... *B60W 50/085* (2013.01); *B60W 40/13* (2013.01); *B60W 50/0225* (2013.01); *B60W 50/06* (2013.01)

(58) Field of Classification Search
CPC .............. B60W 50/085; B60W 40/13; B60W 50/0225; B60W 50/06
See application file for complete search history.

(56) References Cited

U.S. PATENT DOCUMENTS

| | | | | |
|---|---|---|---|---|
| 10,025,318 | B2 * | 7/2018 | Srivastava | .............. G01S 17/89 |
| 10,909,750 | B2 * | 2/2021 | Fukushima | ........... G06T 15/205 |
| 11,136,025 | B2 | 10/2021 | Li et al. | |
| 11,702,072 | B2 * | 7/2023 | El Haj Shhade | ...... G08G 1/167 |
| | | | | 701/36 |
| 2020/0349365 | A1 | 11/2020 | Behrendt | |

FOREIGN PATENT DOCUMENTS

| | | |
|---|---|---|
| EP | 3716137 A1 | 9/2020 |
| WO | 2021193099 A1 | 9/2021 |

\* cited by examiner

*Primary Examiner* — Peter D Nolan
*Assistant Examiner* — Mikko Okechukwu Obioha
(74) *Attorney, Agent, or Firm* — Frank A. MacKenzie; Brooks Kushman P.C.

(57) ABSTRACT

A system includes a processor and a memory. The memory stores instructions executable by the processor to determine a virtual barrier around a vehicle based on receiving a first user input and data indicating a vehicle sprung mass, upon receiving a second user input selecting the virtual barrier, to determine an updated virtual barrier based on the received second user input, upon determining the virtual barrier, to verify that the virtual barrier satisfies one or more vehicle parameters; and to provide output based on the virtual barrier.

18 Claims, 11 Drawing Sheets

VEHICLE PATH ADJUSTMENT

BACKGROUND

Computers can provide commands to operate vehicles autonomously or semi-autonomously. Other vehicles, both moving and non-moving, as well as other moving and/or non-moving objects, may be present in an area where a first or host vehicle operates. Planning a path for the host vehicle, especially when taking into account possible paths of other moving objects, can be challenging.

DETAILED DESCRIPTION

Introduction

Figure 1:
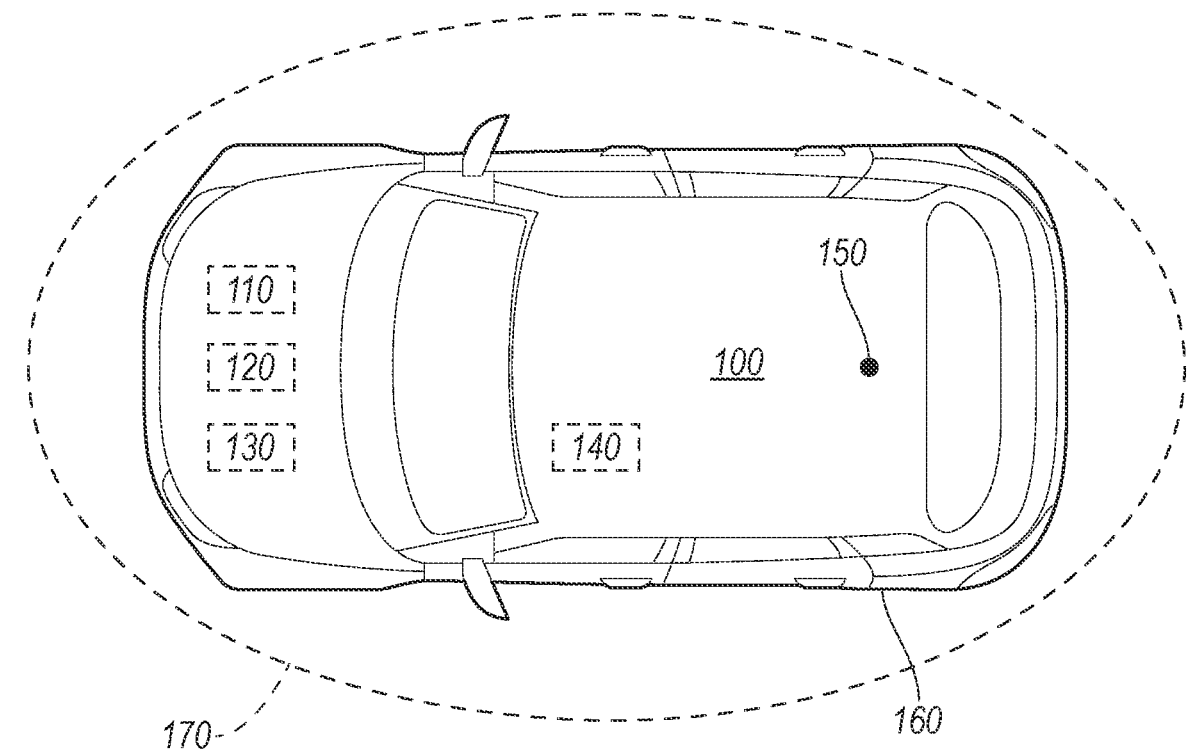
FIG. 1 is a diagram showing an example vehicle with a virtual boundary.

Disclosed herein is a system including a processor and a memory. The memory stores instructions executable by the processor to determine a virtual barrier around a vehicle based on receiving a first user input and data indicating a vehicle sprung mass, upon receiving a second user input selecting the virtual barrier, to determine an updated virtual barrier based on the received second user input, upon determining the virtual barrier, verify that the virtual barrier satisfies one or more vehicle parameters; and to provide output based on the virtual barrier.

The instructions many further include instructions to, upon verifying the virtual barrier, to operate the vehicle based on the updated virtual barrier.

The one or more vehicle parameters may include location of reference point and dimensions of the vehicle sprung mass.

The instructions may further include instructions to verify the virtual barrier by determining whether at least one point of the vehicle sprung mass is outside of the virtual barrier; and upon identifying the at least one point outside the virtual barrier, rejecting the updated virtual barrier, whereby the output includes a rejection of the virtual barrier.

The instructions may further include instructions to reject the virtual barrier upon determining that at least a distance of one point of the updated virtual barrier to the vehicle sprung mass exceeds a distance threshold.

The first user input may include data specifying an adjustment of the vehicle sprung mass of the vehicle as a result of (i) a change of a body of the vehicle, (ii) loading a bicycle on the vehicle, or (iii) attachment of a trailer to the vehicle.

The first user input may include an image representing the adjustment of the vehicle sprung mass.

The first user input may include data specifying a dimension of the adjustment of the vehicle sprung mass.

The dimension of the adjustment of the vehicle sprung mass may be a distance of an outer point of the adjusted vehicle sprung mass relative to a vehicle reference point.

The instructions may further include instructions to receive data from a mobile device identifying a distance of the outer point on an outer surface of the adjusted vehicle sprung mass from the vehicle reference point.

The instructions may further include instructions to generate the virtual barrier based on the first user input and a barrier smoothing technique including a superellipse fitting algorithm.

The first user input may include a shape drawn based on a user input to a user input device specifying a requested virtual barrier around the vehicle.

The virtual barrier may be a two-dimensional closed shape surrounding a projection of the vehicle on a ground surface.

The second user input may be determined based on (i) a user input specifying a buffer space or (ii) activation of a vehicle navigation algorithm.

The second user input may include at least one of: (i) a lateral movement of the virtual barrier relative to the vehicle, (ii) a longitudinal movement of the virtual barrier relative to the vehicle, (iii) a rotation of the virtual barrier relative to the vehicle, (iv) an extension or a compression of the virtual barrier relative to the vehicle.

The instructions may further include instructions, upon receiving the second user input, to generate the updated virtual barrier by defining a second virtual barrier in addition to the virtual barrier.

Further disclosed herein is a method, comprising determining a virtual barrier around a vehicle based on receiving a first user input and data indicating a vehicle sprung mass, upon receiving a second user input selecting the virtual barrier, determining an updated virtual barrier based on the received second user input, upon determining the virtual barrier, verifying that the virtual barrier satisfies one or more vehicle parameters, and providing output based on the virtual barrier.

The method may further include, upon verifying the virtual barrier, operating the vehicle based on the updated virtual barrier.

The method may further include verifying the virtual barrier by determining whether at least one point of the vehicle sprung mass is outside of the virtual barrier; and upon identifying the at least one point outside the virtual barrier, rejecting the updated virtual barrier, whereby the output includes a rejection of the virtual barrier.

The method may further include rejecting the virtual barrier upon determining that at least a distance of one point of the updated virtual barrier to the vehicle sprung mass exceeds a distance threshold.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

A vehicle may traverse a path by actuating vehicle propulsion, braking, and/or steering. The vehicle may be operated by a human operator and/or a computer based on a variety of data, e.g., data about a presence and/or movement of other objects such as vehicles, bicycles, pedestrians, etc. To address challenges arising in planning and/or executing a path for a vehicle by a vehicle computer based on vehicle sensor data, a vehicle computing device can include programming to determine a virtual boundary for a vehicle body based on a shape of the vehicle body, identify one or more objects based on vehicle sensor data, and then, based on the detected one or more objects, the determined virtual boundary, and an input to at least one of propulsion, steering, or braking, to determine at least one of a braking override, acceleration override, or a steering override, and further, based on the determination, can perform at least one of adjusting a vehicle steering and a vehicle speed.

FIG. 1 illustrates an example vehicle 100. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human-machine interface (HMI 140). A reference point 150 can be defined with respect to the vehicle 100, e.g., the illustrated reference point 150 is within the space defined by a vehicle 100 body 160, and, in the current example, is a geometrical center point, i.e., a point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and/or steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations. As discussed below, the computer can include programming to override a human operator or an autonomous vehicle control system, e.g., by actuating a brake, propulsion, and/or steering actuator. For example, the computer 110 may be programmed to execute instructions of an autonomous vehicle control system to operate the vehicle and additionally be programmed based on the techniques disclosed herein to override an operation of the autonomous vehicle control system programmed based on specified conditions, as discussed below. In another example, a first computer 110 may be programmed to operate the vehicle autonomously and a second computer 110 may be programmed to override the first computer 110 when specific conditions are satisfied. In yet another example, a first computer 110 may operate the vehicle based on inputs received from a human operator and a second computer 110 may be programmed based on the techniques herein to override human user actuation commands when specific conditions are satisfied.

The computer 110 may include or be communicatively coupled to (e.g., via a vehicle 100 communications bus as described further below) more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic objects (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic objects, and may be one or more of wireless communication mechanisms, including any desired combination of wireless (e.g., cellular, wireless, satellite, microwave and radiofrequency) communication mechanisms and any desired network topology (or topologies when multiple communication mechanisms are utilized). Exemplary vehicular communication networks include cellular, Bluetooth®, IEEE 802.11, dedicated short-range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. The computer 110 may be programmed to actuate the vehicle 100 actuators 120 including propulsion, steering, and/or braking actuators 120 based on the planned acceleration.

The sensors 130 may include a variety of devices known to provide data to the computer 110. For example, the sensors 130 may include Light Detection And Ranging (LIDAR) sensor(s) 130 disposed on a top of the vehicle 100 that provide data to determine relative locations, sizes, and shapes of one or more targets 200 (or objects) surrounding the vehicle 100, e.g., second vehicles, bicycles, pedestrians, robots, drones, etc., traveling next to, ahead, or behind of the vehicle 100. As another example, one or more radar sensors 130 fixed to vehicle 100 bumpers may provide locations of the target(s) 200 relative to the location of the vehicle 100.

The sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road, infrastructure elements, etc. The computer 110 may be further programmed to determine a current vehicle 100 location based on location coordinates, e.g., GPS coordinates, received from a vehicle 100 location (e.g., GPS) sensor 130.

The HMI 140 may be configured to receive input from a user during operation of the vehicle 100. Moreover, an HMI 140 may be configured to provide output to the user. The HMI 140 is typically located in the passenger compartment of the vehicle 100. In one example, the computer 110 may be programmed to receive a destination location from the HMI 140. The destination location can be specified according to geocoordinates or the like, e.g., according to map data stored in the vehicle 100.

Figure 2:
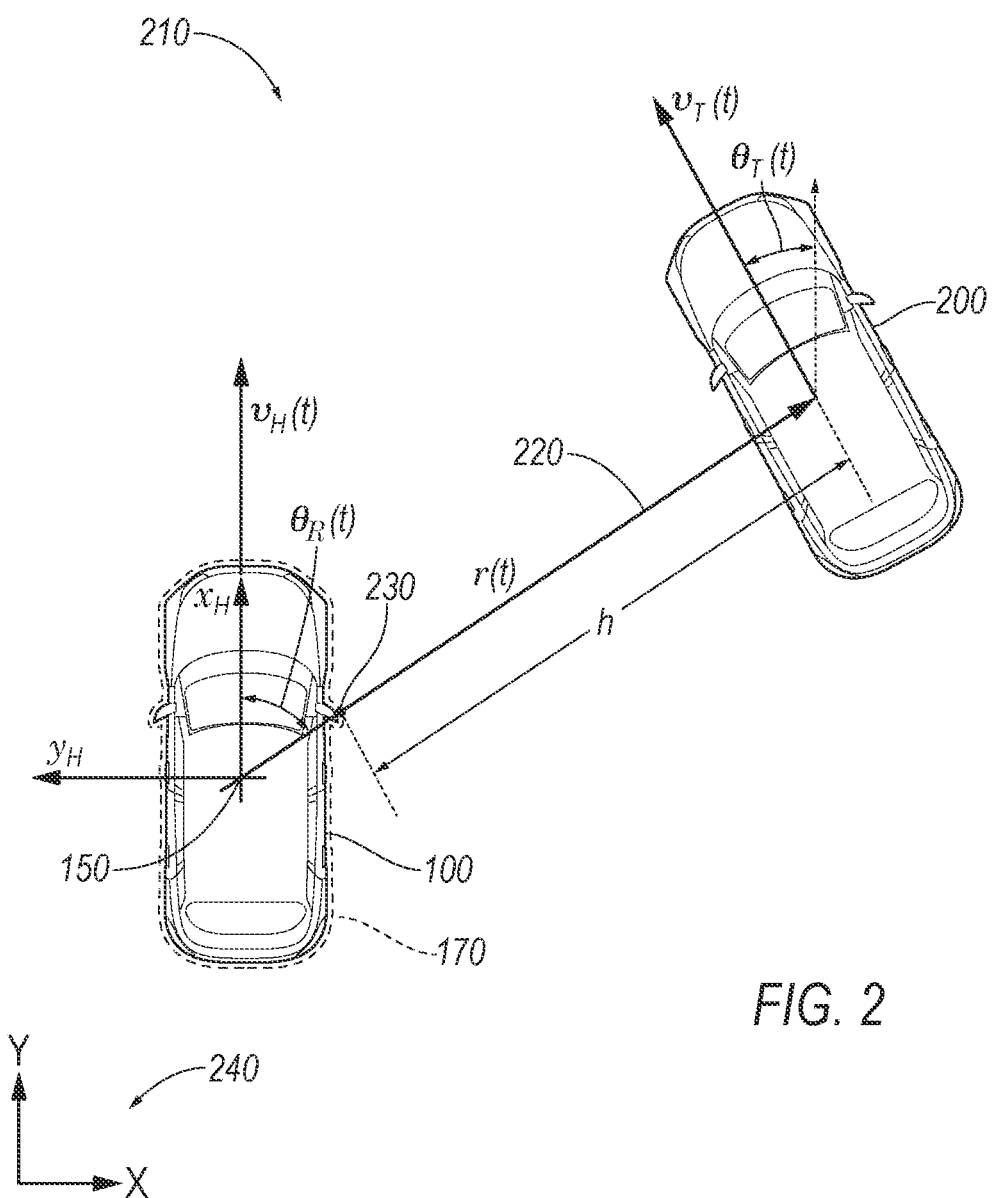
FIG. 2 is a diagram showing the vehicle of FIG. 1 and a target object.

FIG. 2 shows an example operating scenario of the vehicle 100 and a target object, or target 200, e.g., a second vehicle, a pedestrian, etc., within an area 210. An area 210, in the present context, means a portion of a ground surface, e.g., a two-dimensional (2D) area on the surface of the earth. Location coordinates of vehicle(s) 100, target(s) 200, etc., may be defined by global positioning system (GPS) coordinates. Boundaries or edges of an area 210, e.g., defined by connecting vertices of a triangular or rectangular area, specifying a radius from a center of a circular area, etc., may be specified by GPS coordinates. An area 210 may have any suitable dimensions and/or shape, e.g., rectangular, oval, circular, irregularly shaped, etc. An area 210 may include a section of a road, an intersection, etc. An area 210 may be defined by a detection range of a sensor 130, i.e., locations within a predetermined distance, e.g., 200 meters (m), from the sensor 130.

In addition to a vehicle 100, target(s) 200 such as other vehicles, pedestrians, bicycles, etc. may be present in the area. The locations of the vehicle 100 and the target(s) 200 may be specified in a two-dimensional Cartesian coordinate system 240, e.g., having X, Y axes, as shown in FIG. 2. For example, the location coordinates of the vehicle 100 and/or the targets 200 may be defined according to one or more of GPS location coordinates, a coordinate system defined with respect to the vehicle 100, e.g., the reference point 150, a coordinate system defined for a locale or area in which the vehicle 100 is operating, etc.

The computer 110 may navigate the vehicle 100, e.g., based on data received from the HMI 140. For example, the received data may include GPS location coordinates of a destination specified according to user input.

A vehicle 100 can operate on a roadway by determining a path polynomial to traverse a vehicle path. A computer 110 can determine a path polynomial including path coefficients based on vehicle 100 sensor data and/or data received from a remote computer, etc. In the present context, a path is a straight and/or curved line that describes successive locations (i.e., locations at different times) of an object, e.g., a vehicle 100, a target 200, etc., on a two-dimensional (2D) plane parallel to the surface of a roadway upon which the object moves.

The computer 110 may be programmed to actuate vehicle 100 actuators 120, e.g., propulsion, braking, and/or steering actuators 120. In one example, the computer 110 may actuate the vehicle 100 actuators 120 based on input received from a vehicle 100 operator via a vehicle HMI 140, e.g., brake pedal, steering wheel, gas pedal, etc. Additionally or alternatively, the computer 110 may be programmed to operate the vehicle 100 in an autonomous mode by actuating vehicle 100 actuators 120 to navigate the vehicle 100 to a destination while avoiding a collision with other target(s) 200 within the area 210. The vehicle 100 computer 110 can be programmed to determine an acceleration command $u_p$ and a steering command $\delta p$ for the vehicle 100 based on the vehicle 100 destination and sensor 130 data. The computer 110 may be programmed to actuate propulsion and/or braking actuator(S) 120 based on the determined acceleration command $u_p$ and actuate a steering actuator 120 based on the determined steering command $\delta p$.

As disclosed herein, a vehicle computer 110 can detect a road surface, including characteristics or attributes of a ground surface on which a vehicle 100 is operating, and can then, based on the detected road surface, control vehicle 100 operation of propulsion, steering, and/or braking. For example, the vehicle computer 110 could override a vehicle 100 operator input and/or a command generating by a virtual driver program or the like, i.e., a command generated in a vehicle computer 110 to control the vehicle 100 based at least in part on data from one or more vehicle sensors 130. For example, a vehicle 100 computer 110 can be programmed to determine a virtual boundary 170 for a vehicle 100 body 160 based on a shape of the vehicle 100 body 160, to identify target(s) 200 based on vehicle sensor data, based on the detected target(s) 200, the determined virtual boundary 170, and an input to at least one of propulsion, steering, or braking, determine at least one of a braking override, acceleration override, or a steering override, and based on the determination, perform at least one of adjusting a vehicle 100 steering and a vehicle 100 speed.

In the present context, a steering override $\bar{\delta}$, and an acceleration override $\bar{u}$ are respective commands to deviate from a steering command $\delta p$ or acceleration command $u_p$ determined based on user input and/or by a vehicle computer 110. Acceleration override $\bar{u}$ may be an array including propulsion override and braking override.

Figure 3:
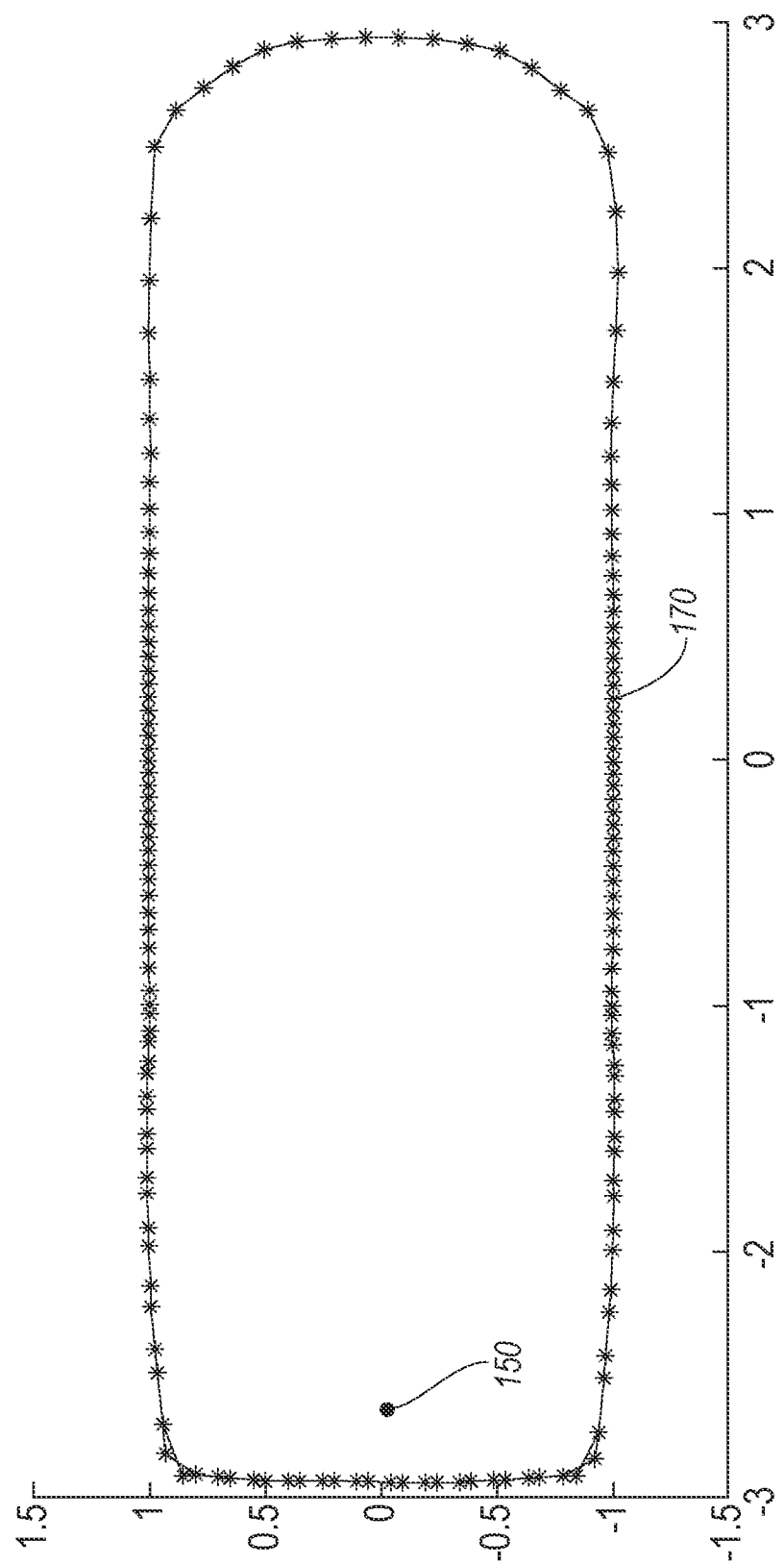
FIG. 3 is a diagram showing another example of a virtual boundary of the vehicle of FIG. 1.

FIG. 3 shows another example of a virtual boundary 170 for the vehicle 100 defined as an area on a ground surface around the vehicle 100, e.g., defined based on an exterior shape of the vehicle 100 in a horizontal plane. Typically the virtual boundary 170 is defined as a projection of the vehicle 100 body 160 on a ground surface, the projection including accessories such as exterior mirrors, bumpers, etc., which may be at different heights (i.e., distances from the ground surface). That is, a top-down view of an outline of a vehicle 100 body 160 could be projected onto a ground surface to define a 2D virtual boundary 170. Thus, a virtual boundary 170 is a two-dimensional closed shape surrounding a projection of the vehicle on a ground surface. Thus, a virtual boundary 170 is a two-dimensional closed shape surrounding a projection of the vehicle on a ground surface. Thus, a virtual boundary 170 defines an area around the vehicle 100 enclosing the body 160 of the vehicle 100. An area of a virtual boundary 170 can be mathematically specified as $\{(r, \theta_R) \in [0, \infty) \times [0, 2\pi) | r \leq \Gamma(\theta_R)\}$. In one example, each point on the virtual boundary 170 is defined to be spaced from a nearest point of the vehicle 100 body 160 by a specified distance, e.g., 10 centimeters (cm). With reference to Equation (1) and FIG. 2 below, the computer 110 may be programmed to specify the virtual boundary 170 by implementing a function $\Gamma(\theta_R)$ that determines a distance from the reference point 150 within the virtual boundary to a point 230 on the virtual boundary at an angle $\theta_R$ angle between a virtual line 220 and reference line $x_h$. In other words, the function $\Gamma(\theta_R)$ can specify various shapes of virtual boundaries as the distance of a point 230 on the virtual boundary 170 and the angle $\theta_R$ vary. The virtual line 220 is an imaginary line extending from the vehicle 100, e.g., from a reference point 150 to a target 200.

The computer 110 may be programmed to operate based on a control barrier function (as discussed below with respect to Expressions (2)-(4)) that determines a barrier distance h along a virtual line 220 extending from the vehicle 100, e.g., a reference point 150, to a target 200. The relative distance h is defined as a distance (or length) along the line 220 from a point 230 on the virtual boundary 170 at respective orientations of a virtual line 220 to the target 200. The point 230 is at an intersection of the virtual line 220 with the virtual boundary 170. A distance h is defined as a distance from the virtual boundary 170 of the vehicle 100 to a target 200.

Additionally or alternatively, as discussed below, h may represent a relative motion between the vehicle 100 and a target 200 taking into account various physical parameters such as relative distance, relative acceleration, relative speed between the vehicle 100 and the target 200. When other physical parameters, such as speed or acceleration. are taken into account, a visualization of distance h and boundary 170 may need to include a third dimension z (not shown).

Alternatively, level sets may be used to illustrate the boundary in the plane. A level-set is an embedding of a higher-dimensional geometric object into a lower-dimensional subspace by fixing one of the independent variables. Examples include visualizing horizontal cut-outs of 3D geometric objects. For example, dimensions of the boundary around the vehicle 100 may either increase or decrease in size depending on a sign of the relative velocity of the vehicle 100 and target 200. For example, if the relative velocity is negative (indicating the vehicle 100 is approaching the target 200), then the virtual boundary 170 would be enlarged. Alternatively, if the relative velocity is positive, the virtual boundary 170 may shrink in size.

Lines $x_h$, $y_h$ illustrated in FIG. 2 are axes of a coordinate system defined with respect to the vehicle 100, i.e., a Cartesian coordinate system having an origin at the reference point 150. Parameters r, Γ, $v_H$, $v_T$, $\theta_R$, $\theta_T$, represent, respectively, (i) a distance between the target 200 and the virtual boundary reference point 150, (ii) a distance of the virtual boundary 170 from the point 230 and the reference point 150, (iii) a velocity vector of the vehicle 100, (iv) a velocity vector (i.e., a vector specifying a direction and magnitude of speed) of the target 200, (v) an angle between the virtual line 220 and reference line $x_h$, and (vi) an angle between the velocity vector $v_T$ of the target 200 and the reference line $x_h$. Expression 1 below thus illustrates a mathematical function for determining the relative distance h.

$$h(r,\theta_R,\theta_T,v_H,v_T) = r - \Gamma(\theta_R) \tag{1}$$

A Control Barrier Function, herein means an expression, i.e., a mathematical relationship, such as Expressions (2)-(4), which define a constraint to be satisfied. A Control Barrier Function (CBF) is a barrier function where, for every state $x(t) \in X$, there exists a control input $u(t) \in U$ such that Expression (2) is true. Note that defining a control barrier function is based on a mathematical model for a system, e.g., $\dot{x}=f(x)+g(x)u$, to specify a state of a system including the vehicle 100 and the target 200. Thus, Expression (1) defines the CBF, Expression (2) may be used to define a set of states x that satisfy the CBF, and Expression (3) defines a dynamic constraint to be enforced via a control input u. With reference to Expression (2) below, the computer 110 may be programmed to operate the vehicle 100 such that the barrier function h(x) is greater than or equal 0 (zero), i.e., avoiding entry of the virtual boundary by a target 20. x(t) represents a location of the vehicle 100 at a time t. The time t is a time at which the vehicle 100 is operated using control barrier function to avoid the target 200 entering the virtual boundary 170 of the vehicle 100.

$$h(x(t)) \geq 0 \tag{2}$$

The computer 110 may determine the propulsion and/or braking override $\bar{u}$ by performing an optimization operation on a control barrier function, e.g., as shown in example Expressions (2), (3), or (4), including a relative distance function h and a derivative of the relative distance function $\dot{h}$. With reference to Expression (3), which specifies a constraint providing an improved approach to avoid entry of the virtual boundary 200 by a target 200, the computer 110 may be programmed to determine the derivative of the distance function based on a derivative of a distance of a virtual line 220 extending from the virtual boundary 170 to the one or more targets 200 and a derivative of the orientation of the virtual line 220 relative to a virtual reference line $x_H$. Expression (3) further depends on a control input u(t), e.g., actuation of steering and acceleration of the vehicle 100. Thus, control function u(t) or a range for the control function u(t) may be identified which satisfies the Expression (3). A function $\dot{h}((x(t), u(t))$ is a temporal derivative of function h based on a state vector x(t) of the vehicle 100 and the control or input vector u(t).

$$\dot{h}((x(t),u(t)) + \lambda h(x(t)) \geq 0 \tag{3}$$

In some examples, to compensate for uncertainty, a margin for the uncertainty may be built into the control barrier function, e.g., as shown in Expression (4). Uncertainty is a measure of potential inaccuracy, or, put another way, specifies a level of expected precision or accuracy, in data from sensors 130. For example, there may be uncertainty in determining the relative distance or relative motion h based on data received from the sensors 130. For example, an object detection sensor 130 determining a distance from a target 200 may have in the inaccuracy of 1 meter.

$$\dot{h}((x(t),u(t)) + \lambda h(x(t) - \varepsilon \geq 0 \tag{4}$$

Equations (5)-(6b), show other examples of defining relative motion h and a derivative of relative motion $\dot{h}$. Function γ is a spatial gradient with respect to a relative heading angle of the vehicle 100, as shown in Expression (6b).

$$h(r, \theta_R, \dot{r}) = r - \Gamma(\theta_R) \tag{5}$$

$$\dot{h}(r, \theta_R) = \dot{r} - \gamma(\theta_R)\dot{\theta}_R \tag{6a}$$

$$\gamma(\theta_R) := \frac{\partial}{\partial \theta_R} \Gamma(\theta_R) \tag{6b}$$

The computer 110 may be programmed to determine (i) an override of propulsion, (ii) a combination of overriding propulsion and steering, (ii) an override of steering only, (iii) an override of steering and an override of braking, or any other combination of overriding propulsion, steering, and braking. The computer 110 may be programmed to determine steering override $\bar{\delta}$ and acceleration override $\bar{u}$ using an optimization technique, e.g., Quadratic Programming. Quadratic programming (QP) is a type of non-linear programming for solving mathematical optimization problems involving quadratic functions; QP can be used to optimize (minimize or maximize) a multivariate quadratic function subject to linear constraints on the variables. For example, the computer 110 may be programmed to identify optimized minimum overrides $\bar{\delta}$, $\bar{u}$ for Expression (3) based on min operation (7). Operation (7) returns minimum values for overrides $\bar{\delta}$, $\bar{u}$ based on, e.g., Expression (3). Thus, based on solving the optimization problem expressed in Expression (7) subject to the constraint given in (3), only certain combinations of steering/braking will satisfy Expression (3). Based on the result of optimization, then, a minimum amount of steering/braking is provided to actuate the vehicle 100 actuators 120.

The computer 110 may be programmed to determine adjusted actuation commands based on the planned values and override values. For example, with reference to Equation (8), the computer 110 may be programmed to determine an adjusted steering actuation $\delta_{adj}$ based on the determined steering actuation $\delta_p$ (e.g., determined by a human operator or an autonomous vehicle control system) and the determined steering override $\bar{\delta}$. With reference to Equation (9), the computer 110 may be programmed to determine an adjusted acceleration actuation $u_{adj}$ based on the determined acceleration actuation $u_p$ (e.g., determined by human operator or autonomous vehicle control system) and the determined acceleration override $\bar{u}$.

$$\min[\bar{\delta} \ \bar{u}] H \begin{bmatrix} \bar{\delta} \\ \bar{u} \end{bmatrix} \tag{7}$$

$$\delta_{adj} = \delta_p + \bar{\delta} \tag{8}$$

$$u_{adj} = u_p + \bar{u} \tag{9}$$

The technique disclosed herein can simultaneously be applied to more than one target 200. Expression (10) specifies a first barrier function $h_1$ for a first target 200 and Expression (11) specifies a second barrier function $h_2$ for a second target 200. The computer 110 may be programmed to identify overrides $\bar{\delta}$, $\bar{u}$ while simultaneously satisfying the Expressions (10)-(11).

$$\dot{h}_1((x(t),u(t)) + \lambda h_1(x(t) \geq 0 \tag{10}$$

$$\dot{h}_2((x(t),u(t)) + \lambda h_2(x(t) \geq 0 \tag{11}$$

Based on, e.g., physical characteristics of vehicle 100 actuators 120, road conditions, etc., maximum allowed acceleration, deceleration, and/or steering actuation limits may be specified. For example, a maximum braking deceleration may be determined based on braking actuator 120 characteristics, e.g., a friction coefficient of brake pads, a vehicle 100 weight, a vehicle 100 aerodynamic resistance, etc., and/or a road condition, e.g., a coefficient of friction, rain, snow, ice, etc.

Equations (12)-(13) show examples of the relative motion function h that further includes maximum allowed deceleration. The operator "sgn" is a function returning 1 (one) for positive input, −1 (minus one) for negative input and 0 (zero) for a 0 (zero) input. A maximum acceleration is computed defined as d in the denominator of Expression (12). When vehicle 100 is heading straight toward the target 200, and can only use deceleration, the value of the function h will be negative if more deceleration is needed than the amount given by d. This is found via kinematic expressions for constant deceleration, i.e., if an initial relative velocity and distance from the target 200 are known, then a constant deceleration will result in a fixed amount of distance traveled. If the actual distance is less than the distance needed, then the vehicle 100 may hit the target 200. The function h is then positive if there is enough distance to stop assuming maximum deceleration. Additionally or alternatively, an additional constraint such as $|\delta_{adj}| \leq \delta_{max}$ may be added to Expressions (10)-(11).

$$h(r, \theta_R, \dot{r}) = r - \Gamma(\theta_R) + \mathrm{sgn}(\dot{r}) \frac{\dot{r}^2}{2d} \tag{12}$$

$$\dot{h}(r, \theta_R) = \dot{r} - \gamma(\theta_R)\dot{\theta}_R + \mathrm{sgn}(\dot{r}) \frac{\dot{r}}{d} \ddot{r} \tag{13}$$

Similarly, a minimum steering distance margin or a "last point to steer" may be determined based on steering actuator 120 characteristics, e.g., a maximum road wheel angle or a maximum lateral acceleration that can be attained by vehicle tires at a given speed. Steering actuator 120 characteristics can be a function of a road condition e.g., a coefficient of friction, rain, snow, ice, etc., and a minimum lateral offset needed to evade a target 200. Equations (14)-(15) show examples of the relative motion function h that further includes maximum allowed lateral acceleration. $a_{y,max}$ is a maximum lateral acceleration. A necessary lateral clearance $s_y$ is calculated based on vehicle 100 geometry and the position of the target 200 relative to the vehicle 100. This is found via kinematic expressions for constant steering at a constant relative velocity; that is, if an initial relative velocity and a lateral displacement from the target 200 is known, then a constant lateral acceleration will result in a fixed amount of lateral distance traveled in a given longitudinal distance. If the actual longitudinal distance is less than the longitudinal distance required to clear the target 200, then the vehicle 100 may hit the target 200. The function h is then positive if there is enough distance to clear the target 200 assuming maximum lateral acceleration.

$$h(r, \theta_R, \dot{r}) = r - \Gamma(\theta_R) + \sqrt{\frac{2s_y}{a_{y,max}}} \dot{r} \tag{14}$$

$$\dot{h}(r, \theta_R) = \dot{r} - \gamma(\theta_R)\dot{\theta}_R + \sqrt{\frac{2s_y}{a_{y,max}}} \ddot{r} \tag{15}$$

Figure 4:
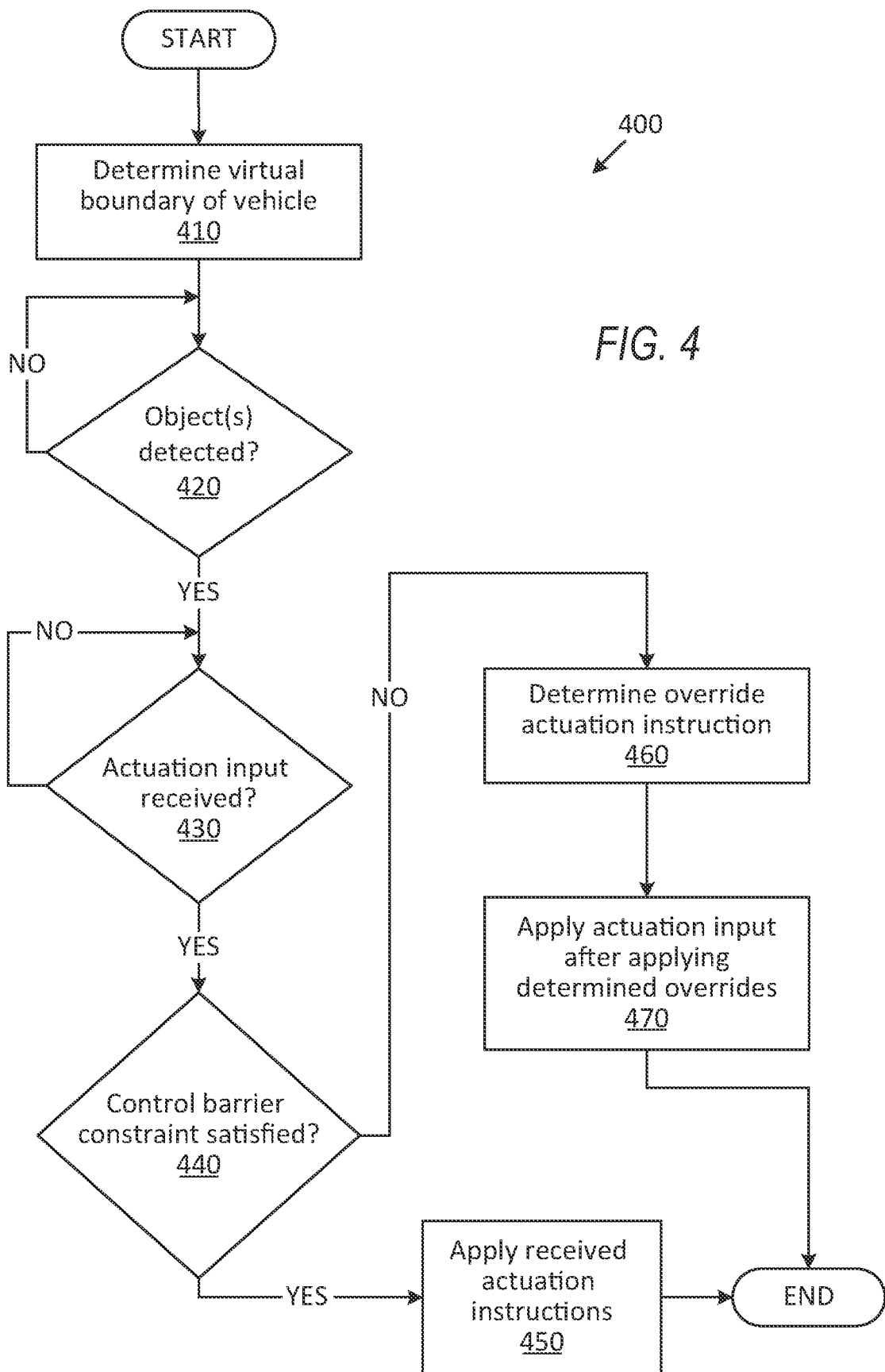
FIG. 4 is a flowchart of an exemplary process for navigating a vehicle.

FIG. 4 is a flowchart of an example process 400 for controlling vehicle 100 operation. The computer 110 may be programmed to execute blocks of the process 400.

The process 400 begins in a block 410, in which the computer 110 determines or receives a predetermined virtual boundary 170 of the vehicle 100. For example, as discussed with respect to FIG. 2, the computer 110 may be programmed to determine and store a function $\Gamma(\theta_R)$ that returns a distance from a reference point 150 of the virtual boundary 170 to a point on the virtual boundary 170 for each given angle specified location $\theta_R$. Alternatively, the computer 110 may store, and/or receive from a remote computer, default virtual boundary 170 definitions.

Next, in a decision block 420, the computer 110 determines whether one or more targets 200, e.g., other vehicles, pedestrians, buildings, vegetation, etc., are detected. The computer 110 may be programmed to identify a target 200 based on data received from a vehicle 100 sensor 130, a remote computer, etc., according to any suitable technique. If the computer 110 determines that one or more targets 200 are detected, then the process 400 proceeds to a decision block 430; otherwise the process 400 returns to the decision block 420.

In the decision block 430, the computer 110 determines whether an actuation input is received. The computer 110 may be programmed to receive an actuation input from a human operator, e.g., via HMI 140, and/or from an autonomous vehicle control system, e.g., a second program stored in the computer 110 memory, an FPGA communicating with the computer 110 via a vehicle 100 network, etc. For example, actuation inputs may include acceleration or deceleration actuation $u_p$ and/or steering actuation $\delta_p$. If the computer 110 determines that actuation input is received, then the process 400 proceeds to a decision block 440; otherwise the process 400 returns to the decision block 430.

In the decision block 440, the computer 110 determines whether a control barrier function, e.g., as specified in Expression (3), is satisfied. In another example, if more than one target 200 is identified, the computer 110 may be programmed to determine whether each of the respective barrier functions, e.g., as shown in Expressions (10)-(11) are satisfied. If the barrier function(s) associated with detected target(s) 200 are satisfied, then the process 400 proceeds to a block 450; otherwise the process 400 proceeds to a block 460.

In the block 450, the computer 110 applies the received actuation inputs of the block 430. Following the block 450, the process 400 ends, or alternatively returns to the block 410, although not shown in FIG. 1.

In the block 460, the computer 110 determines one or both of actuation overrides $\bar{\delta}$, $\bar{u}$. The computer 110 may be programmed to perform an optimization technique to identify propulsion or braking override $\bar{u}$, and/or steering override $\bar{\delta}$ based on a respective Expression (3). In another example, when multiple targets 200 are identified, the computer 110 may identify override actuation $\bar{\delta}$, $\bar{u}$ while satisfying multiple Expressions, e.g., Expressions (10)-(11).

Next, in a block 470, the computer 110 applies adjusted actuation commands $\delta_{adj}$, $u_{adj}$ to the vehicle 100 actuators 120. The computer 110 may be programmed, based on Equations (8)-(9), to determine the adjusted actuation commands $\delta_{adj}$, $u_{adj}$ based on the received actuation input $\delta_p$, $u_p$, and the determined overrides $\bar{\delta}$, $\bar{u}$. Following the block 470, the process 400 ends, or alternatively returns to the block 410, although not shown in FIG. 1.

Figure 5:
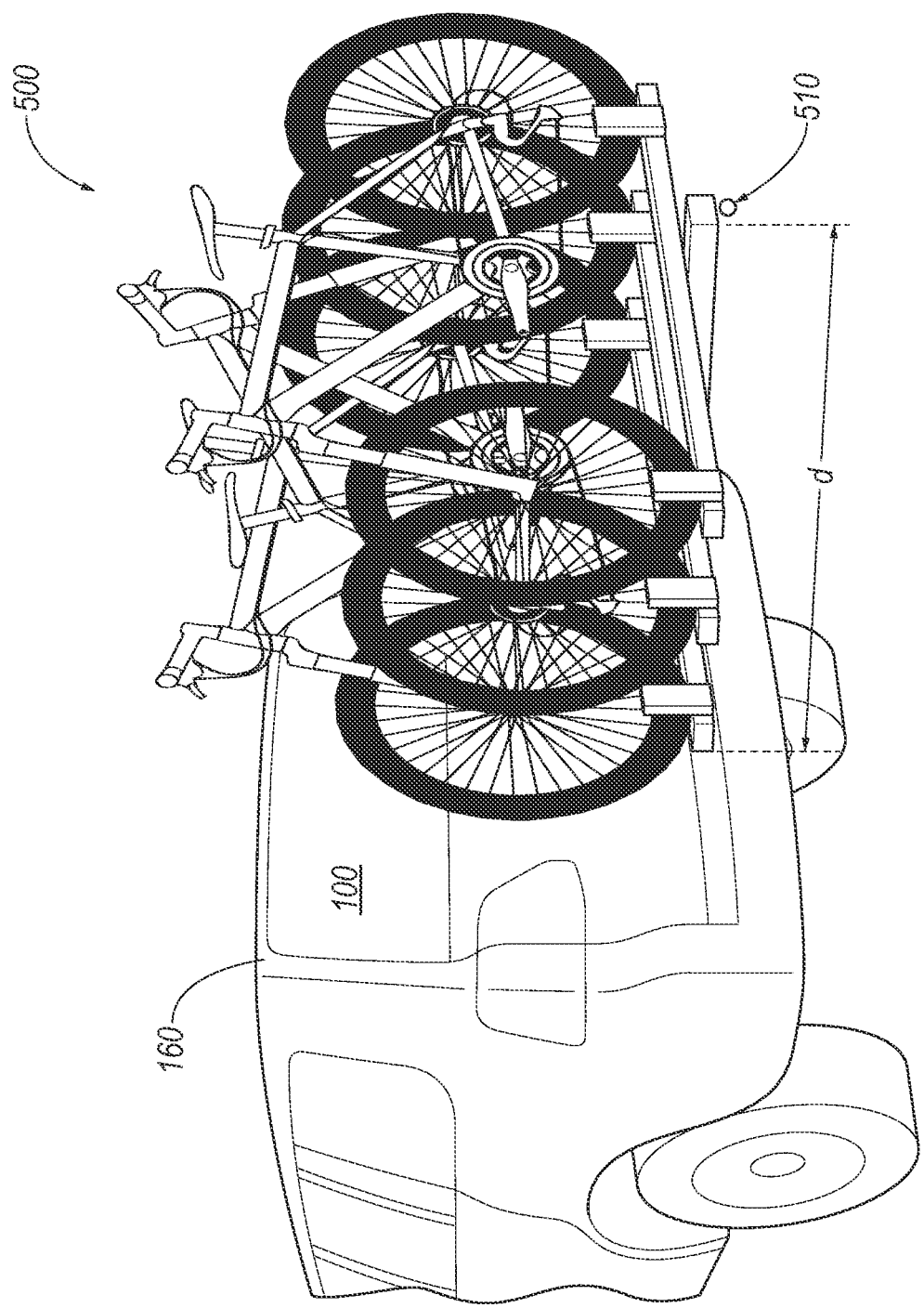
FIG. 5 is an example diagram showing the vehicle of FIG. 1 with an attached bicycle rack.
Figure 6:
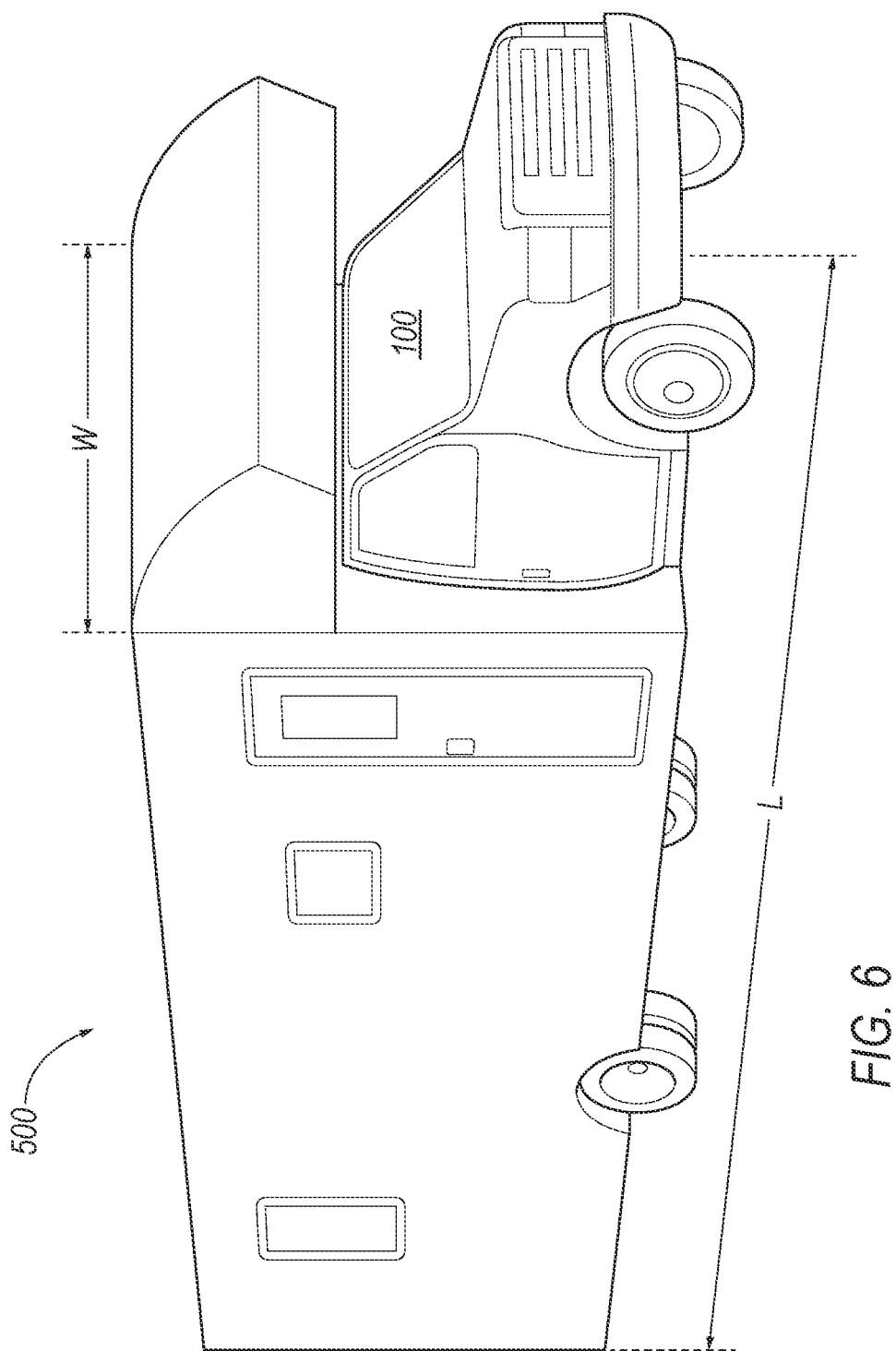
FIG. 6 is an example diagram showing the vehicle of FIG. 1 modified to a recreational vehicle (RV).
Figure 7:
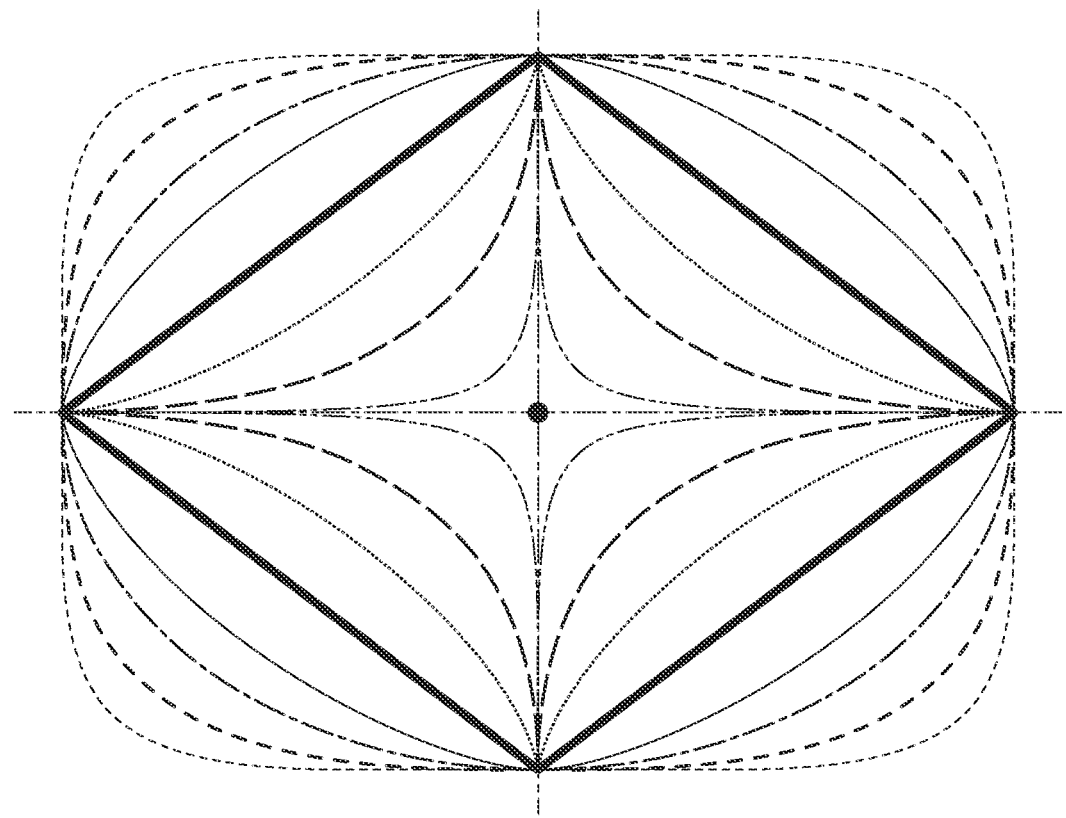
FIG. 7 is a diagram showing examples of superellipses.
Figure 7:
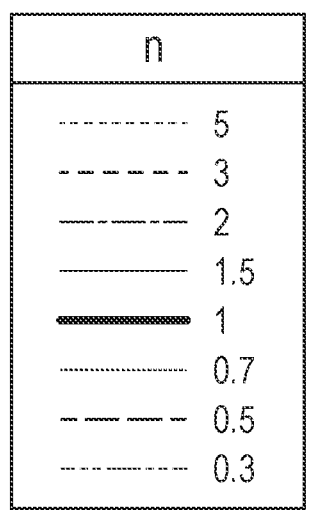

With reference to FIG. 5, a vehicle 100 sprung mass 500 is everything (i.e., all mass) that is supported by a vehicle 100 suspension, e.g., vehicle body, engine, seats, and any attached object such as a bike, etc. FIG. 5 shows an example of a changed sprung mass 500 due to attaching a bicycle rack to the vehicle 100. A virtual boundary 170 as discussed with respect to FIGS. 1-3 may lack the area where the bicycle rack is attached to the vehicle 100. FIG. 6 shows another example of a changed sprung mass 500. A vehicle 100 sprung mass 500 may change by a manufacturer of recreational vehicle (RV), ambulance manufacturer, etc., compared to the sprung mass of the vehicle 100 as was manufactured by the vehicle 100 original equipment manufacturer (OEM).

The computer 110 can be programmed to determine a virtual barrier 170 around a vehicle 100 based on receiving a first user input and data indicating a vehicle 100 sprung mass 500, e.g., dimensions of the vehicle 100 sprung mass 500, upon receiving a second user input selecting the virtual barrier 170, determine an updated virtual barrier 170 based on the received second user input. The computer 110 can be programmed upon determining the virtual barrier 170, to verify that the virtual barrier 170 satisfies one or more vehicle parameters, and to provide an output based on the virtual barrier 170. The computer 110 may be programmed, upon verifying the virtual barrier 170, to operate the vehicle 100 based on the updated virtual barrier 170. Satisfying vehicle 100 parameter means that the virtual barrier 170 includes each point of sprung mass 500 projection on the ground surface.

The vehicle 100 parameters may include a location of reference point 150 and dimensions of the sprung mass, e.g., dimensions L, W as shown in FIG. 6. Dimensions L, W may be determined based on the modifications of the sprung mass of the vehicle 100. With respect to the example shown in FIG. 6, dimensions of the manufactured RV are typically different from the original dimensions of the vehicle 100 produced by vehicle 100, e.g., a truck manufacturer that manufactures the powertrain and chassis of the RV. Thus the dimensions L, W may be different from the dimensions determined by the vehicle 100 manufacturer.

The first user input includes data specifying an adjustment of the sprung mass 500 of the vehicle 100, as a result of (i) attaching an external component or system to the vehicle 100, e.g., attaching a trailer to the vehicle 100, loading bicycle(s) on the vehicle 100, as shown in FIG. 5, and/or a change of a body of the vehicle 100, e.g., modifying a vehicle 100 sprung mass 500 to an RV, ambulance, firetruck, etc., such as shown in FIG. 6. For example, dimensions L, W shown in FIG. 6, shows the adjustment of the sprung mass 500 of the vehicle as a result of converting the vehicle to an RV.

The first user input data may include an image representing the adjustment of the sprung mass 500, e.g., a picture captured by a user's mobile phone and provided to the vehicle 100 computer 110 via a vehicle 100 communication interface. The image may include data from a field of view such as shown in FIG. 5, or any other suitable field of view including the external component, e.g., bicycle rack and a portion of the vehicle 100. In some examples, the first user input data includes multiple images taken from a different point of view, e.g., a right rear corner and left rear corner of the vehicle 100 showing the bicycle rack from different viewpoints.

Additionally or alternatively, the first user input may include data specifying a dimension of the adjustment of the sprung mass. For example, dimension d (FIG. 5) may include a distance for the farthest point of bicycle rack from the rear bumper of the vehicle 100. In one example, dimension d may be measured using a tape measure. In one example, the computer 110 may be programmed to receive data from a mobile device identifying a distance of the point on the outer surface of the adjusted sprung mass from the vehicle 100 reference point 150. The dimension d may be measured using a mobile device equipped with triangulation algorithms to determine the location of the mobile device from a vehicle 100 reference point 150. In one example, a user may hold the device in an outer point or edge 510 (as shown in FIG. 5) of the external component, e.g. trailer, bicycle rack, etc., and then trigger a localization of the device with respect to the vehicle 100 reference point 150. For example, the user device may determine a first distance and a second distance to two reference points in the vehicle 100, e.g., location at which wireless transponders are installed, and then using conventional triangulation techniques determine the distance d. Thus, the first user input data may include data from multiple localizations, e.g., localizing multiple outer locations of the bicycle rack.

Additionally or alternatively, the first user input may include a shape drawn based on user input to a user device specifying a requested virtual barrier around the vehicle 100. For example, the drawn shape may be input via a touch screen of a vehicle 100 user interface. The drawn shape may represent the modified sprung mass of the vehicle 100.

The computer 110 may be programmed to generate the virtual barrier 170 based on the first user input and a barrier smoothing technique. For example, the computer 110 may update the virtual barrier 170 of the vehicle 100 based on the first user input data including dimensions of a bicycle rack attached to the vehicle 100. The computer 110 may be programmed based on a smoothing technique such as is known, e.g., a superellipse fitting algorithm, to generate an updated virtual barrier 170. Additionally or alternatively, other curve fitting or optimization techniques may be used to generate a virtual barrier 170 based on the received first user input and vehicle 100 shape and dimensions.

A superellipse refers to a superset of shapes described by the equation (a*x)^n+(b*y)^n=1 For n larger than or equal to 1, the equation is convex. The superellipse subset thus includes well-known convex shapes such as circles and ellipses. n=2 is the ellipse family, which includes circles. Using a superellipse for convexification is convenient because a superellipse is a generic shape that is convex for orders higher than or equal to 1. In the smoothing step, fitting the user-drawn shape with multiple superellipses with different orders and picking the best fit superellipse has the benefit of smoothness and convexity of the shape of the virtual barrier 170 as well as alleviating the dependence of the fit performance on the regression model structure.

Figure 8:
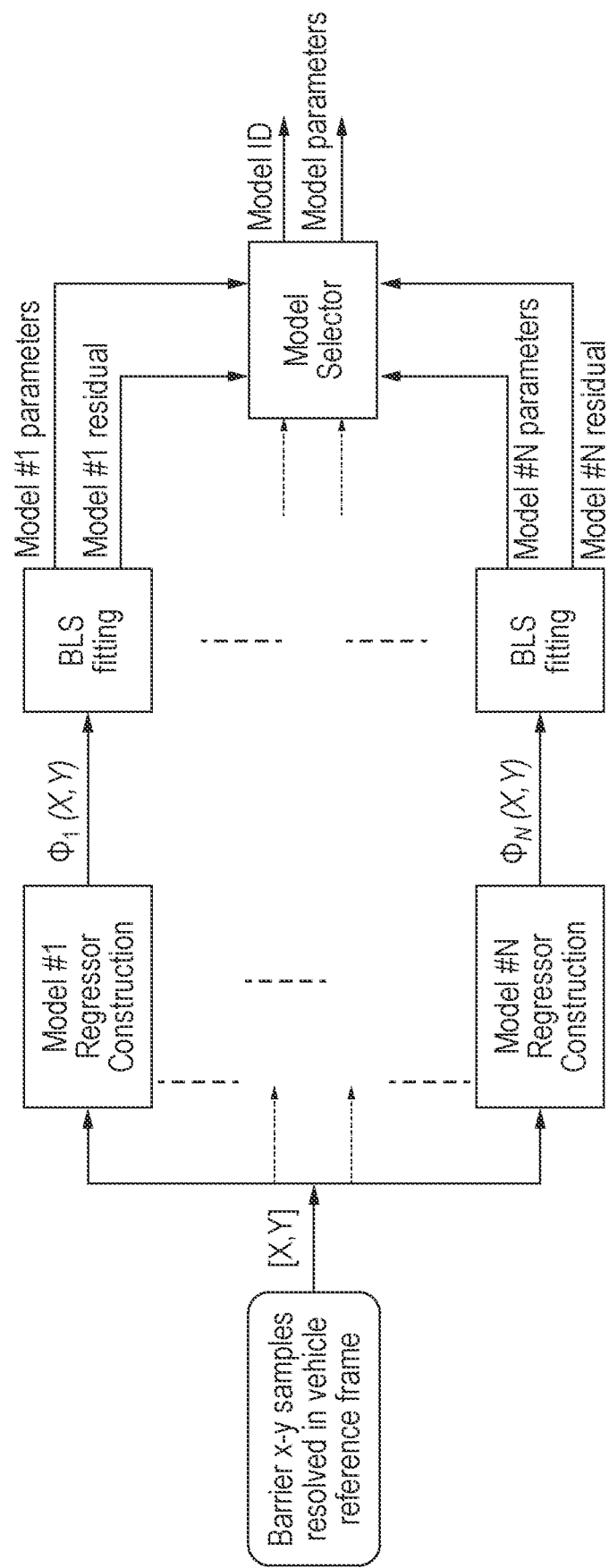
FIG. 8 is a diagram showing a superellipse fitting algorithm.

In another example, as shown in FIG. 8, a multiple-model batch least squares (BLS) estimation may be used to update the virtual barrier 170. In other words, an optimized virtual barrier 170 may be selected based on the first user input data and vehicle 100 parameters such as adjusted sprung mass 500 dimensions, etc. The computer 110 may be programmed based on Equations (16)-(19) to determine multiple models and selected one of the models with a minimum error $\epsilon_i$ $$\Phi_i^T \theta_i = b_i + \epsilon_i \tag{16}$$

$$\Phi_i^T = \begin{bmatrix} x_1^2 & y_1^2 \\ \vdots & \vdots \\ x_M^2 & y_M^2 \end{bmatrix}, b_i = \begin{bmatrix} 1 \\ \vdots \\ 1 \end{bmatrix} \tag{17}$$

$$\hat{\theta}_i = (\Phi_i \Phi_i^T)^{-1} \Phi_i^T b_i \tag{18}$$

$$\epsilon_i = \|\Phi_i^T \hat{\theta} - b_i\|_2 \tag{19}$$

In some examples, the updated virtual barrier 170 may be rejected because of various reasons, e.g., some section or portion of the sprung mass 500 is outside the updated virtual barrier 170. Upon generating an updated virtual barrier 170, the computer 110 may be programmed to verify the virtual barrier 170 based on vehicle 100 parameters by determining whether at least one point of the adjusted sprung mass 500, e.g., the sprung mass 500 including a bicycle rack, is outside of the updated virtual barrier 170, and upon identifying the at least one point outside the virtual barrier 170, rejecting the updated virtual barrier 170. The computer 110 may output data, e.g., to a vehicle 100 human-machine interface (HMI) including a rejection of the virtual barrier 170.

Figure 9:
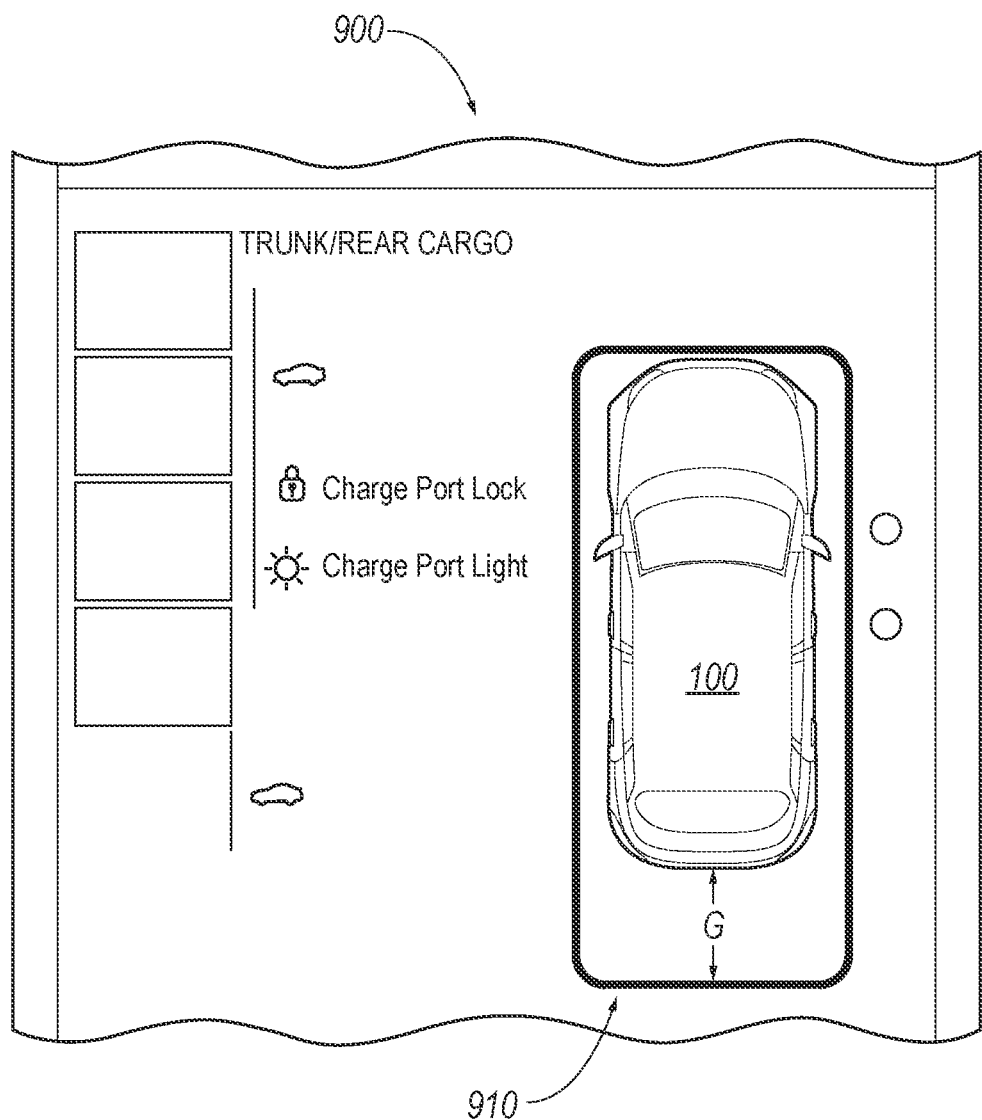
FIG. 9 shows an example image shown on a vehicle user interface including an illustration of a vehicle body and the updated virtual barrier.

In some other examples, an updated virtual barrier 170 may be rejected because the updated virtual barrier 170 is unnecessarily large. The computer 110 may be programmed to reject the virtual barrier 170 upon determining that at least a distance of one point of the updated virtual barrier 170 to the sprung mass exceeds a distance threshold. With reference to the example diagram of FIG. 9, the computer 110 may be programmed to determine that the gap distance G from a rear of the vehicle 100 to a rear end of the updated virtual barrier 170 exceeds a threshold, e.g., 50 centimeter (cm). FIG. 9 shows an image 900 displayed on a vehicle 100 user interface, e.g., output from a computer 110 including an illustration of a vehicle 100 body and a line 910 around the vehicle 100 image which is a representation or display of what is shown and described as the boundary 170 in FIGS. 1 and 3.

Additionally or alternatively, the computer 110 may be programmed to verify the updated virtual barrier 170 based on a relative alignment of the updated virtual barrier 170 with respect to the vehicle 100 longitudinal axis, the reference point 150, etc. For example, the computer 110 may be programmed to reject an update virtual barrier 170 upon determining that an angle between a longitudinal axis of the updated virtual barrier 170 and the longitudinal axis of the vehicle 100 exceeds a threshold, e.g., 1 degree. If one or more of the verifications fail, the computer 110 may be programmed to output data to a user prompting that the updated virtual barrier 170 is not suitable for use and a readjustment of the virtual barrier 170 is needed.

The computer 110 may be programmed to receive a further user input specifying a buffer space around the vehicle 100. For example, upon determining that a portion of the sprung mass 500, e.g., a corner of the attached bicycle, is outside the virtual barrier 170, the second user input may include a buffer space at an area the corner of the attached bicycle to ensure the virtual barrier 170 upon a new update step includes each point of the sprung mass 500.

In another example, upon determining that the virtual barrier 170 has an alignment angle between the longitudinal axes as discussed above exceeding a threshold, or a distance from a virtual barrier 170 from the vehicle 100 sprung mass 500 exceeding a threshold, e.g., as shown by the line 910 of image 900 in FIG. 9, etc., the computer 110 may receive a further user input including (i) a lateral movement of the virtual barrier 170 relative to the vehicle 100, (ii) a longitudinal movement of the virtual barrier 170 relative to the vehicle 100, (iii) a rotation of the virtual barrier 170 relative to the vehicle 100, (iv) an extension or a compression of the virtual barrier 170 relative to the vehicle 100.

The computer 110 may be programmed, upon receiving the further user input, to generate the updated virtual barrier based on the received further user input, e.g., by changing an alignment of the virtual barrier 170 to be aligned with the vehicle 100 longitudinal axis, expand or compress the virtual barrier 170, etc. Additionally or alternatively, with reference to an example shown in FIG. 10, the computer 110 may be programmed to define a second virtual barrier 170' in addition to the virtual barrier 170 to include an attachment to the vehicle 100 that is located outside the virtual barrier 170.

Figure 11:
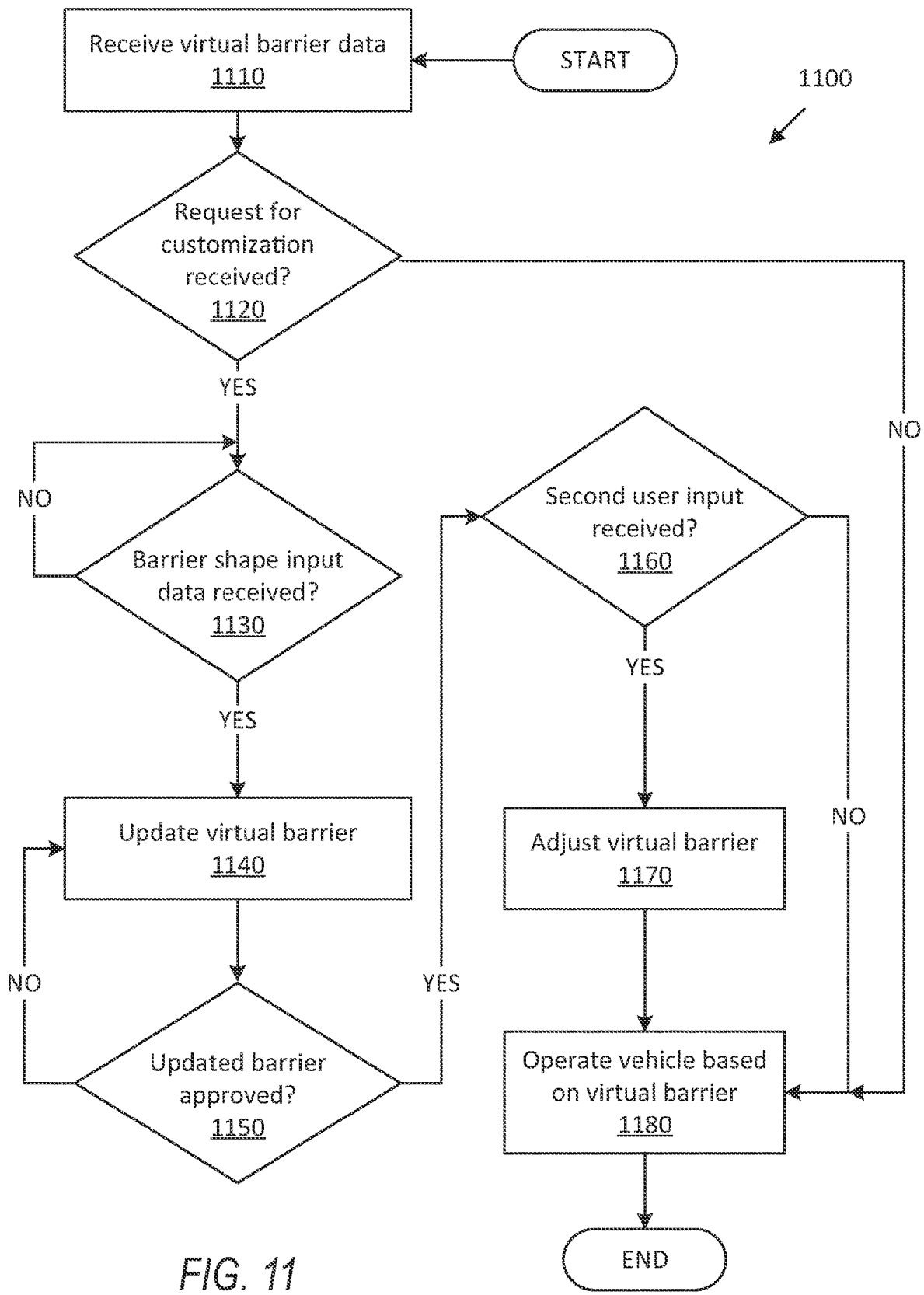
FIG. 11 is a flowchart of an example process for updating a virtual barrier of the vehicle.

FIG. 11 is a flowchart of an exemplary process 1100 for operating the vehicle 100. The computer 110 may be programmed to execute blocks of the process 1100.

The process 1100 begins in a block 1110 in which the computer 110 receives virtual barrier 170 data. The computer 110 may be programmed to receive data specifying the virtual barrier 170 from a computer 110 memory and/or from a remote computer. The received data may specify a virtual barrier 170 such as the example virtual barrier 170 shown in FIG. 3.

In a decision block 1120, the computer 110 determines whether a request for customization of the virtual barrier 170 is received. The computer 110 may be programmed to receive a request for customization from a vehicle 100 user interface, a remote device communicating with the computer 110 via a vehicle 100 wireless or wired interface, etc. If the computer 110 determines that a request for customization of the virtual barrier 170 is received, then the process 1100 proceeds to a decision block 1130; otherwise the process 1100 proceeds to a block 1180.

In the decision block 1130, the computer 110 determines whether barrier shape data is received. The computer 110 may be programmed to receive barrier shape data from a vehicle 100 user interface, e.g., data specifying dimensions of a bicycle rack attached to a rear of the vehicle 100, and/or data received from a remote device such as a mobile device measuring a distance d of an outer point 510 of the sprung mass 500 of the vehicle 100, e.g., changed due to changing a use of the vehicle 100 to an ambulance, fire truck, etc., or attaching a trailer, bicycle rack, etc. The computer 110 may be programmed to receive graphical data, e.g., a sketch input to a user interface entered by a vehicle 100 user illustrating an adjusted sprung mass 500 of the vehicle 100. If the computer 110 determines that barrier shape data is received, then the process 1100 proceeds to a block 1140; otherwise the process 1100 returns to the decision block 1130.

In the block 1140, the computer 110 updates the virtual barrier 170 based on the received barrier shape data, the vehicle 100 dimensions, etc. The computer 110 may be programmed to update the virtual barrier 170 using a smoothing technique, e.g., as discussed with respect to Equations (16)-(19) and FIG. 8, to define a superellipse based on the received barrier shape data and the vehicle 100 parameters, e.g., length L and width W.

Next, in a decision block 1150, the computer 110 verifies the updated virtual barrier 170 to determine whether the updated virtual barrier 170 satisfies the vehicle 100 parameters. For example, the computer 110 may determine whether each point of the vehicle 100 sprung mass 500 is within the updated virtual barrier 170. If the computer 110 approves the updated virtual barrier 170, then the process 1100 proceeds to a decision block 1160; otherwise the process 1100 returns to the block 1140.

In the decision block 1160, the computer 110 determines whether second user data to adjust the virtual barrier 170 is received. The computer 110 may be programmed to receive second user input specifying a buffer space around the vehicle 100, a lateral movement of the virtual barrier 170 relative to the vehicle 100, a longitudinal movement of the virtual barrier 170 relative to the vehicle 100, a rotation of the virtual barrier 170 relative to the vehicle 100, and/or an extension or a compression of the virtual barrier 170 relative to the vehicle 100. If the computer 110 determines that second user data for adjusting the virtual barrier 170 is received, then the process 1100 proceeds to a block 1170; otherwise the process 1100 proceeds to the block 1180.

Figure 10:
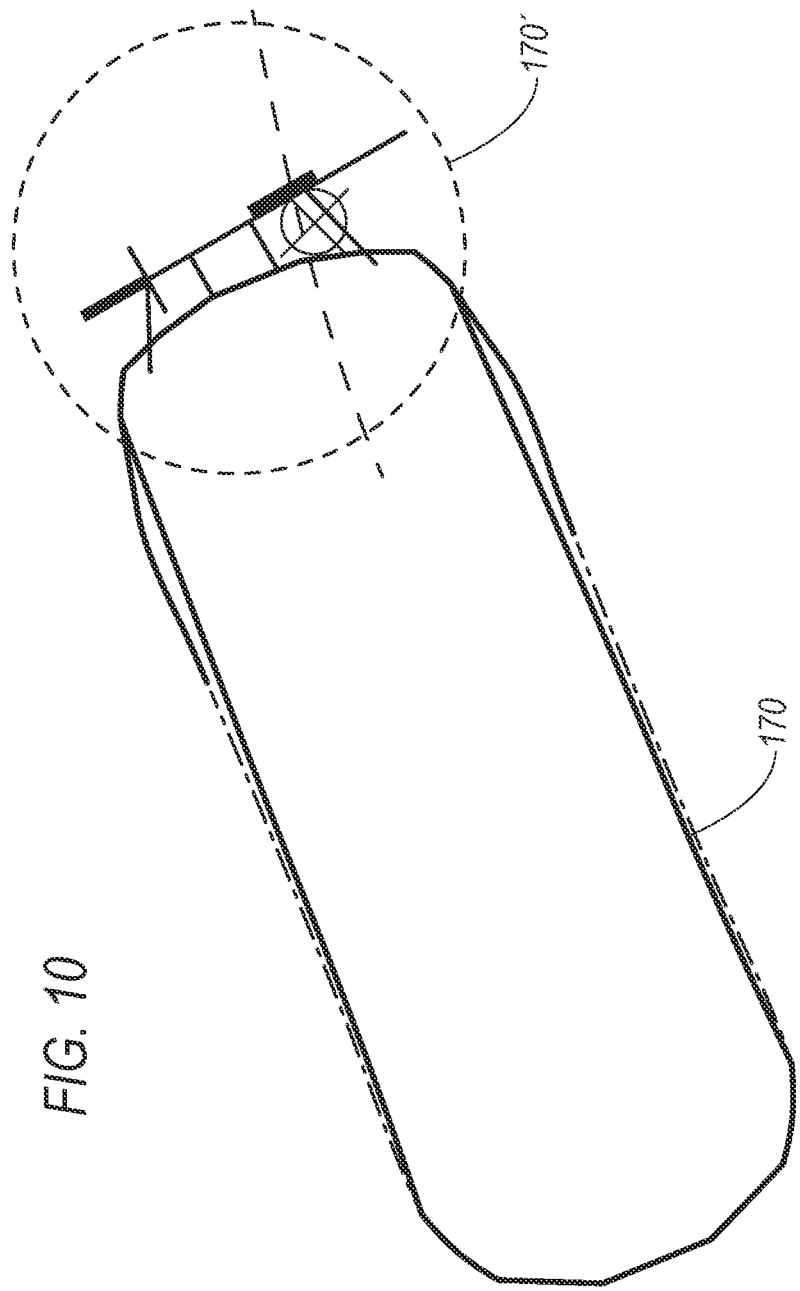
FIG. 10 is a diagram showing an adjusted virtual barrier including a second virtual barrier to include an external component attached to the vehicle.

In the block 1170, the computer 100 adjusts the virtual barrier 170. For example, the computer 110 may be programmed to rotate the updated virtual barrier 170 based on the second user data specifying a rotation of the virtual barrier 170 to align the virtual barrier 170 with a vehicle 100 longitudinal axis. In another example, the computer 110 may adjust the virtual barrier 170 by adding a second barrier 170' around a bicycle rack attached to the vehicle 100, as shown in FIG. 10.

In the block 1180, which may be reached from each of the blocks 1120, 1160, 1170, the computer 110 operates the vehicle 100 based on the virtual barrier 170. The computer 110 may actuate the vehicle 100 actuators 120 based on the determined virtual barrier 170, e.g., the stored virtual barrier 170 (if the block was reached from the block 1120), the updated virtual barrier 170 (if the block was reached from the block 1160), or the adjusted and updated virtual barrier 170 (if the block was reached from the block 1170).

Following the block 1180, the process 1100 ends or returns to the block 1110, although not shown in FIG. 11.

Computing devices as discussed herein generally each includes commands executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine a virtual barrier around a vehicle based on receiving a first user input and data indicating a vehicle sprung mass;
   upon receiving a second user input selecting the virtual barrier, determine an updated virtual barrier based on the received second user input;
   upon determining the updated virtual barrier, verify that the updated virtual barrier satisfies one or more vehicle parameters;
   upon verifying the updated virtual barrier, operate the vehicle based on the updated virtual barrier; and
   in response to the updated virtual barrier not satisfying the one or more vehicle parameters, operate the vehicle without using the updated virtual barrier.

2. The system of claim 1, wherein the one or more vehicle parameters include a location of a reference point and dimensions of the vehicle sprung mass.

3. The system of claim 2, wherein the instructions further include instructions to verify the updated virtual barrier by determining whether at least one point of the vehicle sprung mass is outside of the updated virtual barrier; and upon identifying the at least one point outside the updated virtual barrier, rejecting the updated virtual barrier, whereby the output includes a rejection of the updated virtual barrier.

4. The system of claim 3, wherein the instructions further include instructions to reject the updated virtual barrier upon determining that at least a distance of one point of the updated virtual barrier to the vehicle sprung mass exceeds a distance threshold.

5. The system of claim 1, wherein the first user input includes data specifying an adjustment of the vehicle sprung mass of the vehicle as a result of (i) a change of a body of the vehicle, (ii) loading a bicycle on the vehicle, or (iii) attachment of a trailer to the vehicle.

6. The system of claim 5, wherein the first user input includes an image representing the adjustment of the vehicle sprung mass.

7. The system of claim 5, wherein the first user input includes data specifying a dimension of the adjustment of the vehicle sprung mass.

8. The system of claim 7, wherein the dimension of the adjustment of the vehicle sprung mass is a distance of an outer point of the adjusted vehicle sprung mass relative to a vehicle reference point.

9. The system of claim 8, wherein the instructions further include instructions to receive data from a mobile device identifying a distance of the outer point on an outer surface of the adjusted vehicle sprung mass from the vehicle reference point.

10. The system of claim 1, wherein the instructions further include instructions to generate the virtual barrier based on the first user input and a barrier smoothing technique including a superellipse fitting algorithm.

11. The system of claim 1, wherein the first user input includes a shape drawn based on a user input to a user input device specifying a requested virtual barrier around the vehicle.

12. The system of claim 1, wherein the virtual barrier is a two-dimensional closed shape surrounding a projection of the vehicle on a ground surface.

13. The system of claim 1, wherein the second user input is determined based on (i) a user input specifying a buffer space or (ii) activation of a vehicle navigation algorithm.

14. The system of claim 1, wherein the second user input includes at least one of: (i) a lateral movement of the virtual barrier relative to the vehicle, (ii) a longitudinal movement of the virtual barrier relative to the vehicle, (iii) a rotation of the virtual barrier relative to the vehicle, (iv) an extension or a compression of the virtual barrier relative to the vehicle.

15. The system of claim 1, wherein the instructions further include instructions, upon receiving the second user input, to generate the updated virtual barrier by defining a second virtual barrier in addition to the virtual barrier.

16. A method, comprising:
   determining a virtual barrier around a vehicle based on receiving a first user input and data indicating a vehicle sprung mass;
   upon receiving a second user input selecting the virtual barrier, determining an updated virtual barrier based on the received second user input;
   upon determining the updated virtual barrier, verifying that the updated virtual barrier satisfies one or more vehicle parameters;
   upon verifying the updated virtual barrier, operating the vehicle based on the updated virtual barrier; and
   in response to the updated virtual barrier not satisfying the one or more vehicle parameters, operating the vehicle without using the updated virtual barrier.

17. The method of claim 16, further comprising verifying the updated virtual barrier by determining whether at least one point of the vehicle sprung mass is outside of the updated virtual barrier; and upon identifying the at least one point outside the updated virtual barrier, rejecting the updated virtual barrier, whereby the output includes a rejection of the updated virtual barrier.

18. The method of claim 17, further comprising rejecting the updated virtual barrier upon determining that at least a distance of one point of the updated virtual barrier to the vehicle sprung mass exceeds a distance threshold.

* * * * *